United States Patent [19]
Kronfeld

[11] 4,152,742
[45] May 1, 1979

[54] BACK BAR RETAINER FOR MAGNETIC HEAD

[75] Inventor: Leonard E. Kronfeld, Minneapolis, Minn.

[73] Assignee: Nortronics Company, Inc., Minneapolis, Minn.

[21] Appl. No.: 847,113

[22] Filed: Oct. 31, 1977

[51] Int. Cl.² .......................... G11B 5/10; G11B 5/12
[52] U.S. Cl. .................................... 360/125; 360/129
[58] Field of Search ........ 360/125, 129, 121, 126–127, 360/128–129

[56] References Cited

U.S. PATENT DOCUMENTS

| | | | |
|---|---|---|---|
| 2,621,259 | 12/1952 | Grantham | 360/125 |
| 2,662,120 | 12/1953 | Anderson | 360/125 |
| 3,311,711 | 3/1967 | Maryatt et al. | 360/125 |
| 3,484,562 | 12/1969 | Kronfeld | 360/125 |
| 3,484,565 | 12/1969 | Kronfeld et al. | 360/125 |
| 3,495,048 | 2/1970 | Gooch | 360/129 |
| 3,508,229 | 4/1970 | Stencel et al. | 360/129 |
| 3,744,040 | 7/1973 | Honegger et al. | 360/129 |
| 3,767,209 | 10/1973 | Seehawer | 360/129 |
| 3,936,884 | 2/1976 | Hogan | 360/125 |

Primary Examiner—Alfred H. Eddleman
Attorney, Agent, or Firm—Merchant, Gould, Smith, Edell, Welter & Schmidt

[57] ABSTRACT

A spring retaining clip resiliently urges the back bar core piece of a magnetic head assembly into contact with the back ends of two other core pieces whose front ends define the head gap. Use of the clip permits installation of the head coil on one of the core pieces and installation of the back bar after the core pieces have been secured, ground and lapped in the head housing, thus simplifying the manufacturing process. In a preferred embodiment the retainer clip has a first surface member for engaging or being glued to the side of the back bar, and a pair of resilient tabs for engaging the back ends of the pole pieces when the back bar is installed with the clip holding the back bar and the pole pieces tightly together. A grounding wire for the core can be soldered to the retaining clip.

6 Claims, 6 Drawing Figures

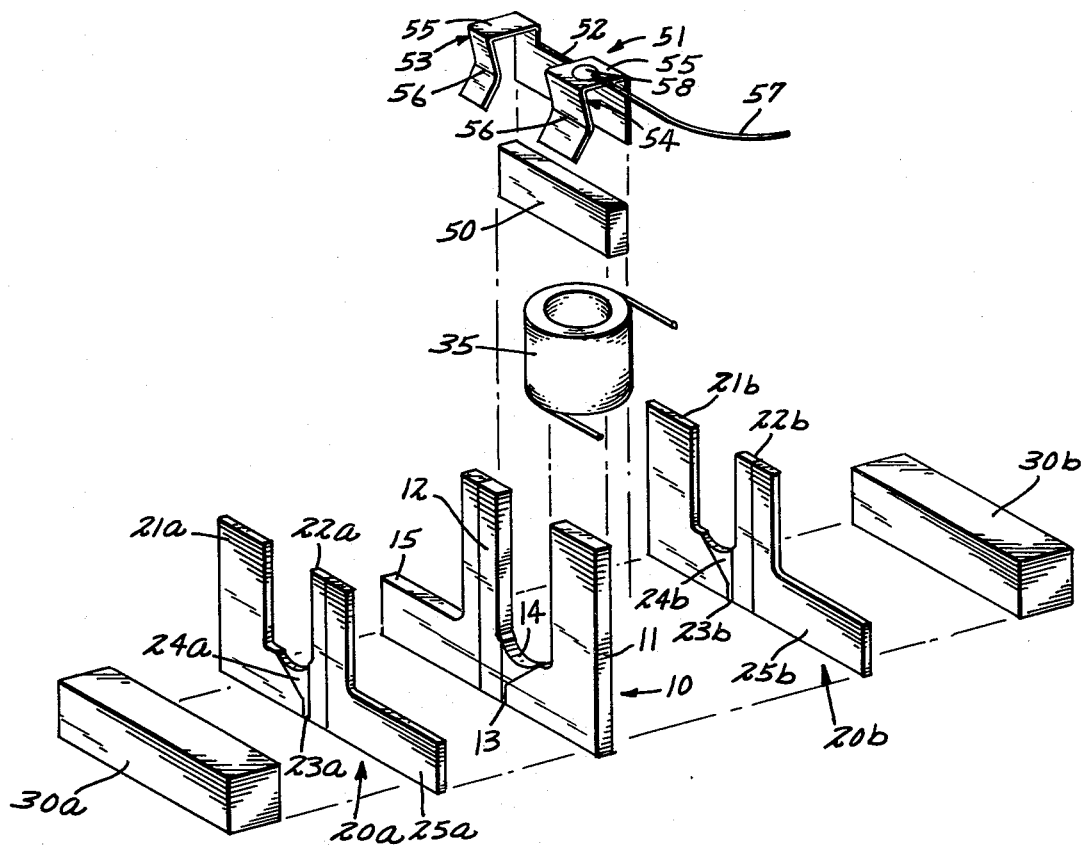
FIG. 1
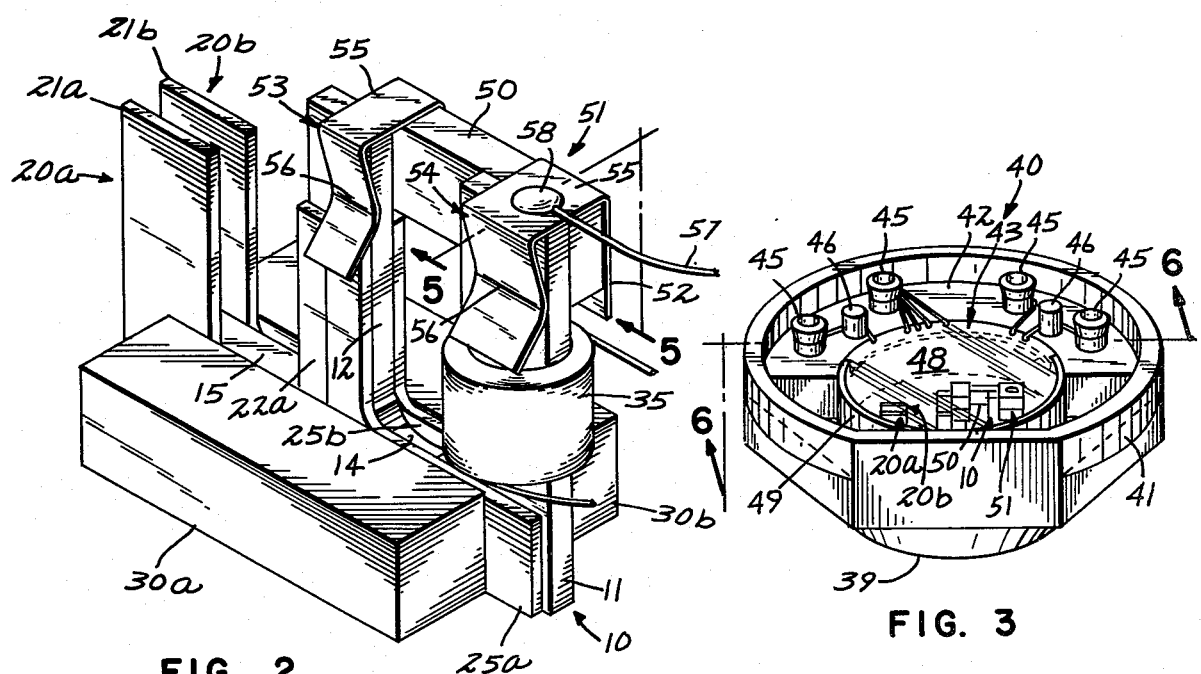
FIG. 2
FIG. 3

BACK BAR RETAINER FOR MAGNETIC HEAD

BACKGROUND OF THE INVENTION

The present invention pertains generally to magnetic head assemblies, and specifically to a spring retaining clip for securing the back bar to the other core pieces of the magnetic head, to permit simplified manufacturing and assembly procedures.

Although the preferred embodiment of the invention as disclosed herein is described in terms of a read/write head for magnetic floppy disc memory, it will be understood that the principle of the invention applies equally well to read, write or erase heads, for single or multiple head assemblies, for audio, video, computer memory or other magnetic recording/reproduction applications.

A common design for a magnetic head involves a number of core pieces which are positioned together to define the magnetic core of the head. Often, there may be a pair of core pieces made of ferrite or other common core material which have first ends, hereinafter referred to as the "front" ends which are configured to be positioned adjacent each other to cojointly define the head gap. Means are provided for securing these core pieces together in that position. The other ends, hereinafter referred to as the "back" ends of these core pieces are typically separated from each other and an additional core piece, usually referred to as the back bar, is provided for bridging the back ends of the other two core pieces to complete the magnetic circuit. The coil or coils as the case may be, for the head assembly are placed around one or more of the core pieces prior to assembly of the back bar.

In one of the methods of manufacturing a magnetic head assembly of this general type prior to the development of the present invention, it was necessary to assembly the entire core before placing it in the head housing. Because of the extremely small physical dimensions involved, it would have been very difficult to complete the assembly of the core subassembly after placing it within the confines of the protective housing. Thus, it was necessary to place the coil on one of the core pieces with the wires therefor hanging loose, and to glue the back bar in place. The assemblied core unit was then secured in the head housing and the head face was ground and lapped. Subsequently, the wires for the coil (or coils if more than one head were involved in the assembly) were connected to terminal posts, a grounding wire for the core was secured, and a potting material was then poured into the housing.

The above manufacturing procedure was subject to the likelihood of the damage to the fragile core assembly, or breakage to the fragile lead wires. Also, it has been found that the layer of epoxy between the back ends of the core pieces and the back bar prevented intimate contact therewith, resulting in back gaps in the magnetic circuit, which tended to degrade performance. Further, these back gaps were of non-uniform thickness from one unit to the next, resulting in tolerance problems in the performance of the head.

The present invention overcomes these and other problems by providing a spring retaining clip to hold the back bar in place on the back ends of the core pieces. This permits the core subassembly to be positioned within the protective housing, before installation of the coil, thus minimizing danger of damage to the core or wires. After the core is positioned and secured in the housing, in which process the clean back ends of the core pieces can be used as a positioning reference, the face of the head is ground and lapped, and the coil and back bar can be installed. Finally, the electrical connections to the coil or coils can be made, and a grounding connection for the core assembly can be made by a wire attached to the clip.

In the preferred embodiment, the back bar is adhesively secured by epoxy to a surface member of the spring retaining clip, and a ground wire for the core can be soldered to the clip. This permits the back bar to be installed by simply pushing the clip down over the projecting back ends of the core pieces, following which the assembly can be potted.

SUMMARY OF THE INVENTION

According to the present invention, there is provided an improved magnetic head assembly of the type including magnetic core pieces, means positioning the core pieces to define a read, write or erase gap, and an additional core piece, or back bar, for positioning and contact with the ends of the other core pieces to complete a magnetic circuit for the magnetic head. Means are provided for resiliently engaging the additional core piece and the ends of the other core pieces to hold them together to complete the magnetic circuit. In a preferred embodiment, the resilient engaging means comprises a retaining clip having a surface member which may engage or be adhesively secured to a side of the additional core piece, or back bar, and one or more resilient tabs for fitting over the ends of the core pieces to hold the back bar in contact with the core pieces. According to another feature of the invention, the grounding for the core may be accomplished by a grounding wire electrically attached to the retaining clip.

BRIEF DESCRIPTION OF THE DRAWING

FIG. 1 is an exploded perspective of a magnetic head core assembly which incorporates the present invention;

FIG. 2 is a perspective view of the assembled structure of FIG. 1;

FIG. 3 is a perspective view of the head assembly of the present invention;

DESCRIPTION OF THE PREFERRED EMBODIMENT

Figure 4:
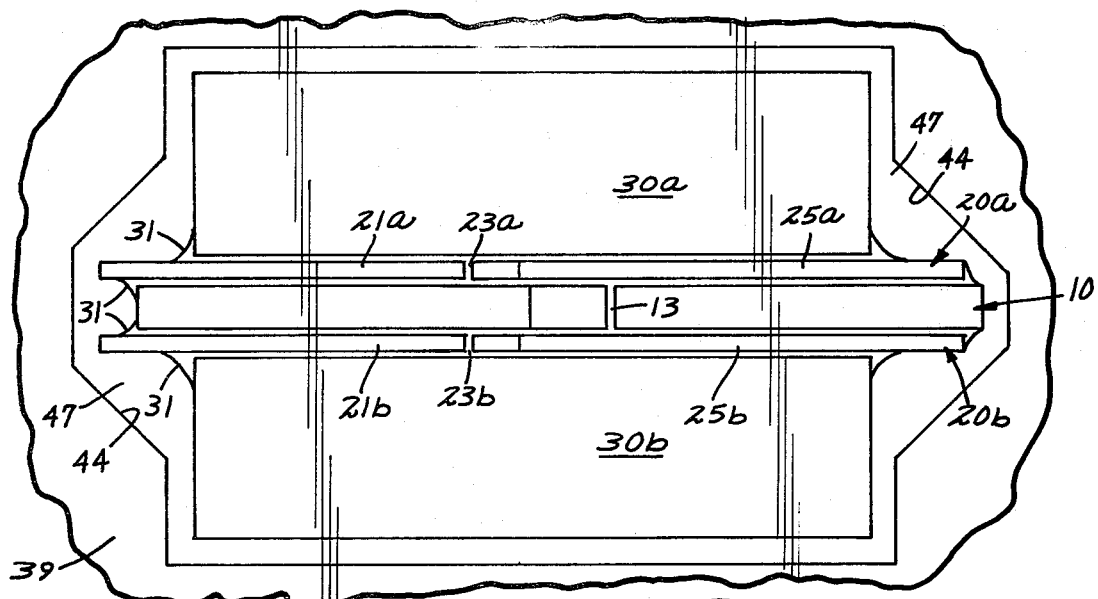
FIG. 4 is a greatly enlarged fragmentary plan view of the face of the magnetic head assembly of FIG. 3.

Referring to FIGS. 1 and 2, a core assembly for a magnetic head assembly using the present invention is shown. The invention is shown as applied to a multiple head assembly having a read/write head sandwiched between a pair of erase heads, but it will be understood that the invention can be just as advantageously applied to any type of multiple or single erase, read, write or combination read/write heads. In FIGS. 1 and 2, the read/write head core pieces are assembled into a wafer indicated by reference number 10, and the erase wafers are indicated by reference numbers 20a and 20b.

Read/write wafer 10 comprises an L-member ferrite core piece 11, and an I-member ferrite core piece 12. Members 11 and 12 are configured so that at their front ends the head gap 13 is provided. In FIG. 1 and other drawings, the head gaps are exaggerated in width for purposes of illustration. A fillet of bonding glass 14 positions and secures members 11 and 12, and extends through the gap region 13. A ceramic L-shaped spacer 15 is secured to I-member 12 by glass bonding.

Erase wafers 20a and 20b are identical, and the following description of erase wafer 20a applies also to erase wafer 20b, with an appropriate change in the reference number subscripts. Wafer 20a comprises an erase core L-member 21a and an erase core I-member 22a, which are positioned together at their front ends to define head gap 23a. The gap and the space between the L and I-members is filled by a fillet of bonding glass 24a. An L-shaped ceramic spacer 25a is bonded to core I-member 22a.

The erase wafers and the read/write wafer are reversed with respect to each other so that the ceramic spacer of the read/write wafer is adjacent the core members of the erase wafers, and vice versa. The three wafers are stacked together with a pair of ceramic outrigger pads 30a and 30b positioned adjacent the erase wafers, and the wafers and outriggers are glass bonded together to form a core assembly as shown in FIG. 2. The techniques by which the core pieces are glass bonded together, and the wafers and ceramic parts are glass bonded thereto is generally known in the art and will not be described in detail here.

Figure 6:
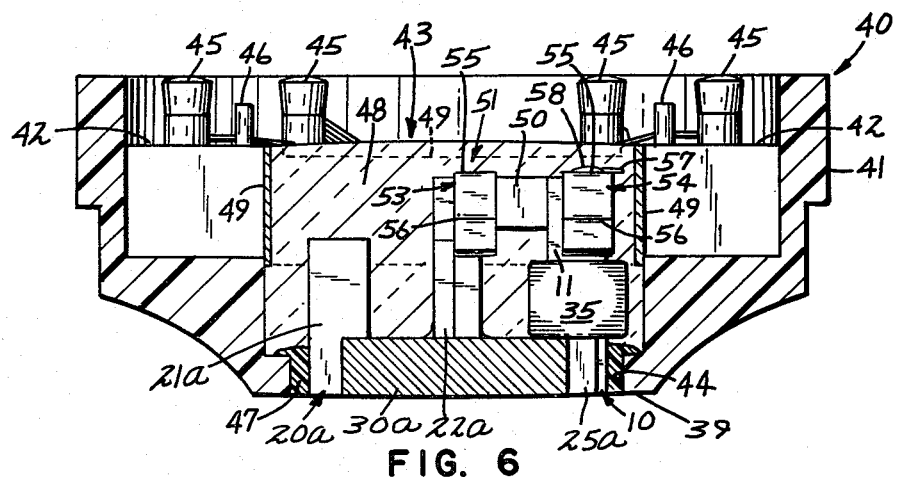
FIG. 6 is a sectional view taken along line 6—6 of FIG. 3, on an enlarged scale.

The head assembly housing is indicated in FIGS. 3 and 6 by reference number 40. The housing has an outer collar portion 41, an interior ledge portion 42, and a central recess area generally designated by reference number 43 in FIG. 6. Electrical terminals 45 are inserted in ledge portion 42, as are wire guide posts 46. The face 39 of housing 40 has a cutout to receive the core subassembly.

As shown in FIG. 6, the core subassembly is positioned in the central recess of the protective housing 40, with the gap defining front ends of the core pieces and the outrigger pads fitting in the cut-out 44. The tops of I-member 12 and L-member 11 of the read/write core can be used as reference points for measuring the proper insertion depth of the core assembly into the housing. Initially, the core assembly may project slightly from the cut-out, and the core assembly is secured to the housing by epoxy, which is indicated in FIGS. 4 and 6 by reference number 47. After the epoxy has set, the face 39 and exposed portions of the core assembly are ground and lapped to the desired finish. A magnetic shield 49 may be provided as shown in FIG. 3.

In FIG. 4, which shows an enlarged plan view of the face of the head assembly, the read/write gap 13 and the erase gape 23a and 23b are exaggerated in width for illustration purposes. The glass bonding material which holds the wafers and outrigger pads together is indicated by reference number 31.

Referring again to FIGS. 1 and 2, after the core assembly has been installed in the head housing, the read/write coil 35 can be slipped down over L-member 11. The erase coil (not shown) can likewise be slipped down over erase coil L-members 21a and 21b. The electrical leads for these coils can then be brought up to the appropriate electrical terminal posts 45 and soldered.

The magnetic circuit for the read/write head is completed by the back bar which is indicated in the drawings by reference number 50. Back bar 50 is made of ferrite and has a length corresponding to the distance between the outside edges of the back ends of core pieces 11 and 12, so that when positioned adjacent and in contact with the core pieces, it will complete the magnetic circuit for the read/write head.

Figure 5:
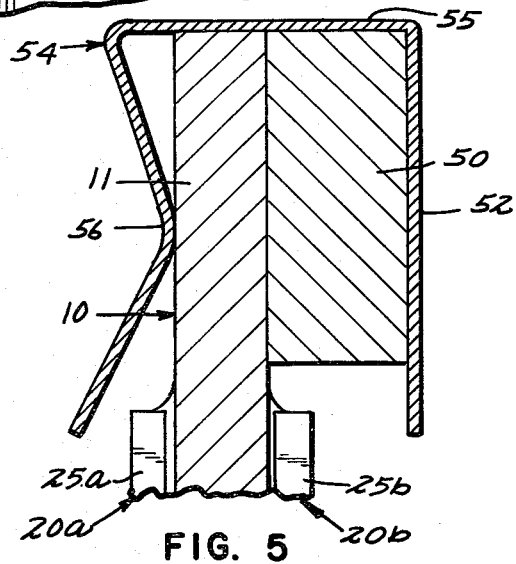
FIG. 5 is an enlarged sectional view taken generally along line 5—5 of FIG. 2.

The retaining clip according to the present invention is best seen in FIGS. 1, 2 and 5, where it is designated generally by reference number 51. In the preferred embodiment, back bar 50 is rectangular in cross section and retaining clip 51 has a flat surface portion 52 for contacting one side of back bar 50. Clip 51 also has a pair of resilient tab portions 53 and 54 designed to engage the back ends of the read/write core L and I-members. The tabs have bridge portions 55 which extend at right angles to surface member 52, and core engaging portions 56 which extend downwardly and inwardly, then flare outwardly at their lower ends to facilitate slipping on the cores.

A grounding wire 57 may be soldered to the retaining clip as at 58 to provide a ground for the core assembly.

In the preferred embodiment, ground wire 57 is attached to clip 51 as by soldering at 58, and surface portion 52 is bonded to one side of back bar 50 by a suitable adhesive such as epoxy. Back bar 50 and clip 51 are then slid into place with the other side of back bar 50 in contact with the flat sides at the back ends of members 11 and 12. The lower portions 56 of tabs 53 and 54 engage the ends of the core members and as the back bar is pushed further into place, the outwardly bent lower portions ramp up the back ends of the core pieces, resiliently bending the tabs, which generates the resilient force urging the side of back bar 50 into contact with the core members.

As seen in FIG. 5, the back bar is in direct contact with the core members, rather than being separated by a layer of epoxy as in the prior art method. Accordingly, the back gap for the head is extremely and uniformly low.

After the back bar and spring clip are installed, the grounding wire can be soldered to the appropriate terminal, and the core assembly can be protected within the head housing by pouring in a suitable potting material such as indicated in FIGS. 3 and 6 by reference number 48.

By use of the present invention, the need for assembling the coil and back bar prior to securing the core assembly within the head housing, and the attendant risk of breakage is eliminated. Further, since the back ends of the core pieces are free and clean, they may be used as measuring references for positioning the core assembly in the housing. The retaining clip provides a secure and easy to install means for holding the back bar in place to minimize back gaps while at the same time providing a convenient means for grounding the core. An additional benefit is that prior to potting the back bar can be removed, allowing interchanging of coils for experimental purposes.

I claim:

1. A magnetic head assembly, comprising:

first and second magnetic core pieces having first ends adapted to cojointly define a read, write or erase gap and having other ends with flat sides for contacting a back bar;

means for positioning and securing said first and second core pieces with their first ends adjacent one another to define said gap;

a coil positioned around at least one of said core pieces;

a back bar core piece of rectangular section for positioning in contact with the other ends of both said first and second core pieces to complete the magnetic circuit; and a retaining clip having a first surface member for engaging a side of said back bar, and having a pair of resilient tabs for engaging said other ends of said first and second core pieces, so as to hold the other side of the back bar in contact with the flat sides of said other ends of first and second core pieces.

2. A magnetic head assembly according to claim 1 including a grounding wire connected to said retaining clip.

3. A magnetic head assembly according to claim 1 wherein said first surface member of said retaining clip is adhesively secured to the side of the back bar.

4. A magnetic head assembly according to claim 3 wherein said tabs have bridge portions extending from the first surface member of the clip, across the back bar and ends of the core pieces when assembled, and wherein said tabs have core contacting portions extending from the bridge portions in the same direction as the first surface member for resiliently contacting said core piece ends.

5. A magnetic head assembly according to claim 4 wherein the outer ends of the core contacting portions of said clip are bent at an acute angle to facilitate installation of the clip on the core pieces.

6. A magnetic head assembly according to claim 4 including a grounding wire soldered to the bridge portion of one of said tabs.

* * * * *